(12) United States Patent
Farrell et al.

(10) Patent No.: US 11,609,937 B2
(45) Date of Patent: Mar. 21, 2023

(54) EFFICIENT ASSOCIATION OF RELATED ENTITIES

(71) Applicant: FAIR ISAAC CORPORATION, Roseville, MN (US)

(72) Inventors: Brent Farrell, Roseville, MN (US); Michael Betron, Roseville, MN (US)

(73) Assignee: FAIR ISAAC CORPORATION, Roseville, MN (US)

( * ) Notice: Subject to any disclaimer, the term of this patent is extended or adjusted under 35 U.S.C. 154(b) by 64 days.

(21) Appl. No.: 16/352,571

(22) Filed: Mar. 13, 2019

(65) Prior Publication Data

US 2020/0293557 A1  Sep. 17, 2020

(51) Int. Cl.
  G06F 16/28 (2019.01)
  G06F 16/901 (2019.01)
  G06F 16/23 (2019.01)
  G06F 16/22 (2019.01)

(52) U.S. Cl.
  CPC ........ *G06F 16/288* (2019.01); *G06F 16/2228* (2019.01); *G06F 16/23* (2019.01); *G06F 16/285* (2019.01); *G06F 16/9024* (2019.01)

(58) Field of Classification Search
  None
  See application file for complete search history.

(56) References Cited

U.S. PATENT DOCUMENTS

| | | | |
|---|---|---|---|
| 8,583,659 B1 * | 11/2013 | Alexandrescu | G06F 16/24578 707/748 |
| 9,384,571 B1 * | 7/2016 | Covell | G06Q 10/10 |
| 10,606,892 B1 | 3/2020 | Broecheler | |
| 2008/0281801 A1 | 11/2008 | Larson et al. | |
| 2009/0132561 A1 * | 5/2009 | Cormode | G06F 16/958 |
| 2010/0083194 A1 | 4/2010 | Bagherjeiran et al. | |
| 2012/0317142 A1 | 12/2012 | Broecheler et al. | |
| 2012/0317579 A1 | 12/2012 | Liu | |
| 2015/0161228 A1 | 6/2015 | Davies | |
| 2016/0212022 A1 | 7/2016 | Abou Mahmoud et al. | |
| 2017/0053294 A1 | 2/2017 | Yang et al. | |

(Continued)

OTHER PUBLICATIONS

Geeksforgeeks, "Find all reachable nodes from every node present in a given set", Dec. 2016; accessible from <https://www.geeksforgeeks.org/find-all-reachable-nodes-from-every-node-present-in-a-given-set/> (Year: 2016).*

(Continued)

*Primary Examiner* — Aleksandr Kerzhner
*Assistant Examiner* — Anugeetha Kunjithapatham
(74) *Attorney, Agent, or Firm* — Mintz, Levin, Cohn, Ferris, Glovsky and Popeo, P.C.; F. Jason Far-hadian, Esq.

(57) ABSTRACT

Systems and methods for efficient association of related entities. The method may comprise accessing a database of records, using a processor, to identify a set of unoptimized entities represented by one or more nodes in a graph model, a connection between a first node and a second node in the one or more nodes representing an association between a first entity represented by the first node and a second entity represented by the second node; determining the first entity is unoptimized; and determining a set of related entities for the unoptimized first entity in the graph model, the graph model having at least one common entity with a corresponding label model.

20 Claims, 3 Drawing Sheets

(56) References Cited

U.S. PATENT DOCUMENTS

| | | |
|---|---|---|
| 2018/0081937 A1 | 3/2018 | Broecheler |
| 2018/0130239 A1 | 5/2018 | Mohr et al. |
| 2018/0203945 A1 | 7/2018 | Barber |
| 2018/0285478 A1* | 10/2018 | Wright .................. G06F 16/248 |
| 2018/0336457 A1* | 11/2018 | Pal ...................... G06F 16/9024 |
| 2019/0251480 A1* | 8/2019 | Garcia Duran ........ G06N 20/00 |
| 2019/0266528 A1* | 8/2019 | Cheng .................... G06N 20/00 |
| 2020/0153934 A1* | 5/2020 | Burbank ............. H04L 41/0893 |

OTHER PUBLICATIONS

Liu et. al, "Discovering communities in complex networks by edge label propagation", Mar. 2016 (Year: 2016).*

Xie et. al, "LabelRank: A Stabilized Label Propagation Algorithm for Community Detection in Networks", Mar. 2013 (Year: 2013).*

Ghrab et. al., "GRAD: On Graph Database Modeling", download from <https://www.researchgate.net/publication/301857276_GRAD_On_Graph_Database_Modeling>, Feb. 2016 (Year: 2016).*

* cited by examiner

EFFICIENT ASSOCIATION OF RELATED ENTITIES

COPYRIGHT & TRADEMARK NOTICES

A portion of the disclosure of this patent document may contain material which is subject to copyright protection. The owner has no objection to facsimile reproduction by any one of the patent documents or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter generally relates to resolving associations between entities and, more particularly, to properly identifying and tracking associations between related entities in a distributed computing environment in an efficient manner.

BACKGROUND

Credit fraud is one of the most prevalent types of fraud and is typically initiated when a criminal uses false or synthetic identity information to enter into a relationship with a lender to obtain credit with the intent to defraud. Once the criminal has established a line of credit, he can default on the outstanding credit without recourse. In some scenarios, organized groups may conspire to defraud a lender by creating multiple synthetic profiles based on fabricated identities. Without the ability to readily determine associations between entities known to be involved in credit abuse, fraud detection may be difficult.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, a method for efficient association of related entities may comprise accessing a database of records, using a processor, to identify a set of unoptimized entities represented by one or more nodes in a graph model, a connection between a first node and a second node in the one or more nodes representing an association between a first entity represented by the first node and a second entity represented by the second node; determining the first entity is unoptimized; determining a set of related entities for the unoptimized first entity in the graph model, the graph model having at least one common entity with a corresponding label model; in response to determining that at least a second entity from among the related entities is stored in the label model, determining whether the second entity is associated with a first label; in response to determining that the second entity in the label model is associated with the first label, associating the first unoptimized entity with the first label; storing the first entity in the label model in association with the first label; and updating the graph model to indicate the unoptimized entity has an optimized status.

In response to determining that the second entity in the label model is associated with the first label, the related entities for the first entity may be associated with the first label and stored in the label model in association with the first label. A second label may be generated in response to determining that the second entity in the label model is not associated with the first label. The second label may be distinguishable from the first label. The first entity and the related entities may be stored in the label model in association with the second label.

The graph model may be represented by a data structure in which related entities are identified by way associating a first record, including the first entity, with a second record, including the second entity, using a pointer mechanism connecting the first record and the second record. The label model may be represented by a data structure in which related entities are identified by way of associating related entities with a common label. The common label may be a predetermined value. The optimized status may be defined by a flag configured to have a first state when a respective entity is optimized, and the flag configured to have a second value when the respective entity is unoptimized.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments.

Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
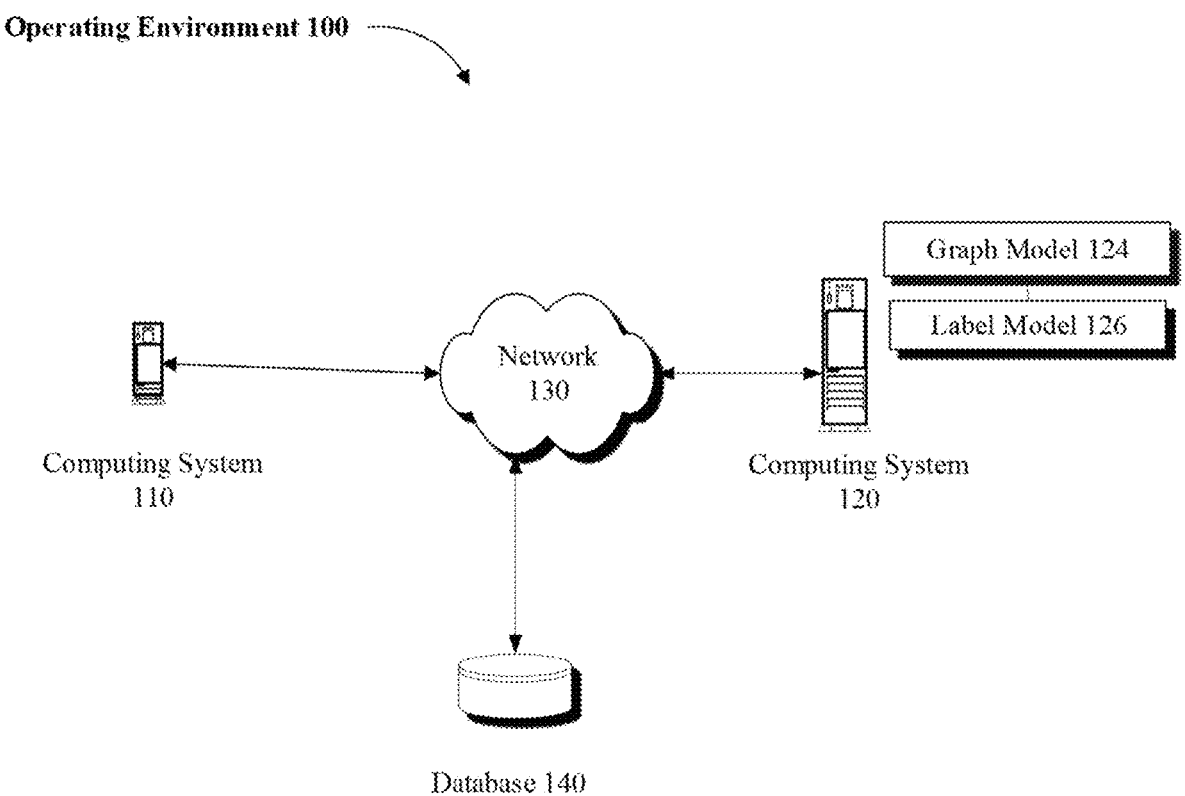
FIG. 1 illustrates an example operating environment in accordance with one or more embodiments, wherein a graph model and a label model may be implemented for the purpose of efficient tracking of associations among various parties.

Referring to FIG. 1, an example operating environment 100 is illustrated in which a list of related entities may be determined and provided based on information stored in a database 140. Database 140 may include information about a plurality of entities and the relationships between said entities. As shown, computing system 110 may be a general purpose computer, a handheld mobile device (e.g., a smart phone), a tablet or other communication capable computing device. Software such as a web browser, a dedicated app or other type of software application may be running either fully or partially on computing system 110 to enable or activate certain features disclosed herein.

Computing system 110 may, for example, communicate over a network 130 to access data stored in database 140 or to access services provided by a computing system 120. Depending on implementation, database 140 may be local to, remote to, or embedded in one or more of computing systems 110 or 120. Data structure and data models, such as graph model 124 or label model 126, may be configured on or manipulated by computing systems 110 or 120 to service one or more requests. The request may be submitted by computing system 110 (e.g., a client system) via network 130. Network 130 may be implemented over a local or wide area network (e.g., the Internet).

In example embodiments, computing systems 110 and 120 may be implemented over a centralized or distributed (e.g., cloud-based) computing environment as dedicated resources or may be configured as virtual machines that define shared processing or storage resources. Execution, implementation or instantiation of objects or software code that accesses or manipulates databased 140, graph model 124 or label model 126, or the related features and components may define a special purpose machine that provides remotely situated client systems, such as computing system 110, with access to a variety of data and services as provided by computing system 120.

In accordance with one or more implementations, the provided services by computing system 120 or other special purpose machines, including software executed thereon, may include providing a user with information about one or more entities (e.g., persons, applicants, identifiable individuals, etc.), where information about such entities is stored, managed or tracked in database 140 in cooperation with graph model 124 and label model 126 as provided in further detail herein. The entity information may also include relationships between the entities based on one or more degrees of association.

Accordingly, in certain embodiments, database 140 may be implemented to store information about entities and entity relationships by instantiating a plurality of nodes in a graph model 124. A node may include a main entity and references to secondary entities related to the main entity. For example, graph model 124 may be represented in graphical terms as a connected nodal graph in which a first entity is a node in the graph and the secondary entities are other nodes in the graph connected to the node including the main entity by way of one or more edges, where one or more edges may signify one or more association between the entities in the graph.

The above implementation of a graph model may be configurable such that the relationships between the entities may be updated. To add a relationship between first and second entities, for example, a search may be performed to find the nodes that represent the first entity and the second entity, where a pointer included in the first node points to the second node. In such implementation, the pointers may represent the edge between the two nodes (i.e., the relationship between the two entities). Accordingly, a node may have multiple pointers to other nodes, indicating multiple relationships between a first entity represented by the first node and other entities represented by the other respective nodes in the graph model.

In a scenario where it is desirable to generate a list of related entities to a first entity, an iterative search may be performed across the nodes in graph model 124 from a first node representing the first entity, for example, all the way through the path of all the secondary nodes and the children of the secondary nodes. This iterative parsing may need to be exhaustive through the entire graph model 124 because each branch or path connecting the first node to all the related nodes may have to be parsed. Such exhaustive search may be inefficient and time consuming due to the number of routes and nodes in each route that are to be considered or parsed.

For example, if a node A is connected to nodes A1, A2, A3 and each node A1, A2, A3 has three children of its own (A11, A12, A13, A21, A22, A23, A31, A32, A33), then 12 paths ($3^1+3^2$) in the graph are to be parsed to determine all the entities and relationships. At the next level, assuming that each node continues to have three children, 39 paths ($3^1+3^2+3^3$) would have to be parsed. As such, as the number of levels n and the number of children x (i.e., signifying the number and depth of relationships between the nodes) in the graph grows, the number of paths parsed to create a list of related entities is exponentially increases by a magnitude of nx.

As such, performing an exhaustive parsing of the nodes in a graph model 124 would require a substantial level of resources and is time consuming as the number of branches and the depth of relationships increases in graph model 124. To reduce the parsing order, in example embodiments, entries in graph model 124 may be optimized by implementing a corresponding label model 126, which may be searched in a linear order (e.g., order of n or order of x) instead of an exponential order (i.e., order of nx). Such implementation would provide improvements both in parsing efficiency and resource management.

Figure 2:
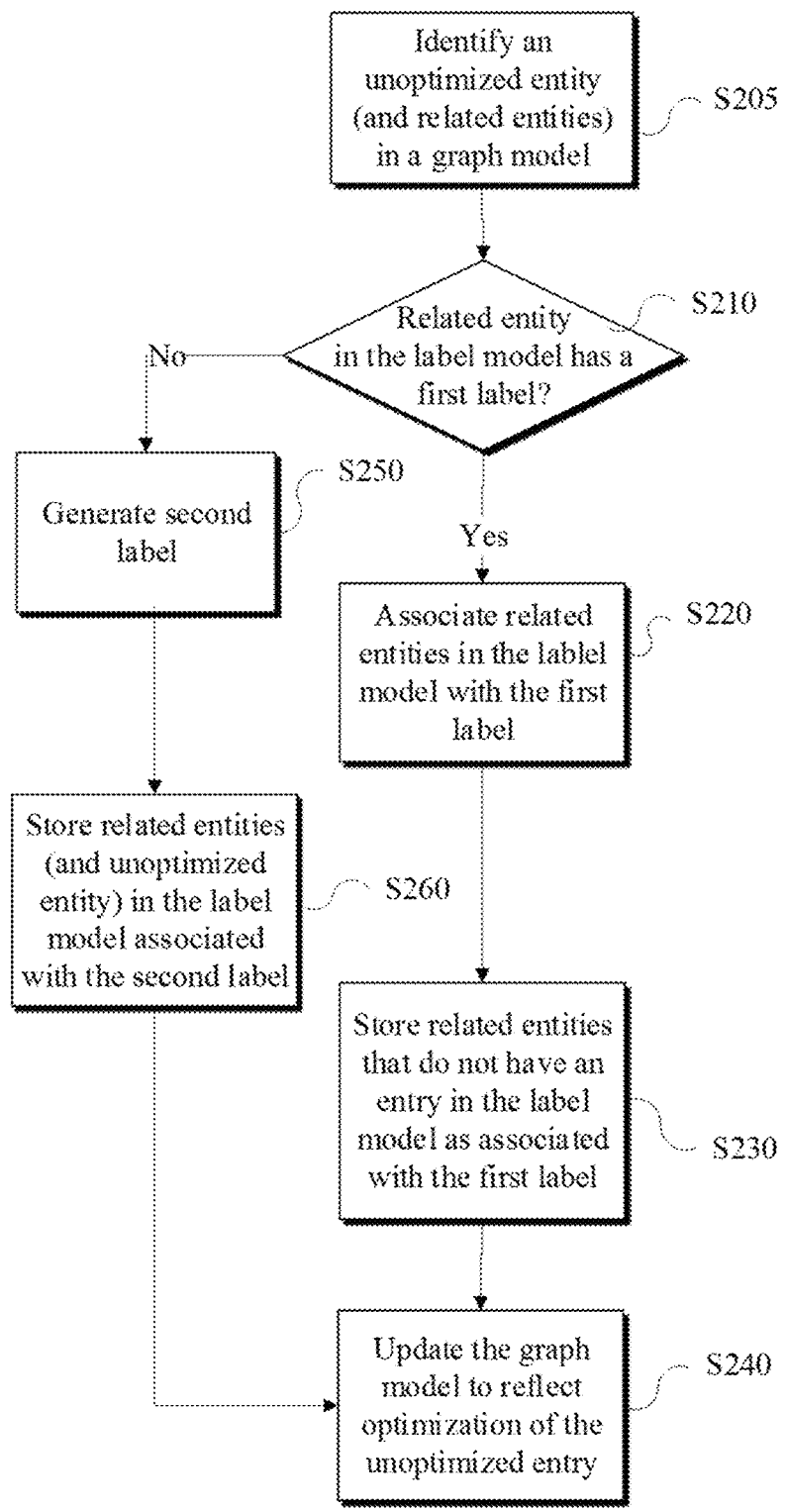
FIG. 2 is an example flow diagram of a method of tracking associations among various parties, in accordance with one embodiment.

Referring to FIG. 2 and the example scenarios provided herein, in accordance with one aspect, label model 124 may be implemented such that entities that are related to each other are grouped (e.g., into a single group) by way of associating a label (e.g., unique label) to the related entities. For example, generating a list of entities that are related to an entity X may be performed in an efficient manner by first searching for entity X in graph model 124, finding a first label L1 associated with the entity X and searching for one or more or all other entries in the database that are labeled with L1.

The data structures for managing the entity searching or parsing may be implemented in any form. In one example embodiment, the data structure may be implemented in the form of a computational table, for example, in which under a first column the entities are listed, and under a second column the corresponding labels for the entities are listed. As provided in further detail herein, entries in graph model 124 may be managed and updated as new entities are added, using the label model 126. That is, searching the entries in graph model 124 may be optimized by converting the graph model 124 into a label model 126 that includes the same entities and relationships but is faster to parse for the purpose of generating a list of the related entities.

The manner in which graph model 124 and label model 126 may be updated and managed is provided herein with reference to FIG. 2. By way of an overview, a method for associating entities may include associating entities in graph model 124 with entities in label model 126, such that the associated entities in graph model 124 may be optimized by way of label model 126. In this manner, graph model 124 provides for a horizontal scale efficiency for resolving entities, while labeled model 126 leverages efficiencies for entity retrieval during entity exploration and analysis.

An implementation for resolving entries between the two models may be useful for entity resolution applications (e.g., data quality, master data management) as well as applications that examine entities and their relationships (e.g., graph analytics, fraud detection, etc.). A graph model for relating entities may include building a relationship graph for the entities in the system. If the entities are represented as vertices in the graph, while relationships are represented as edges in the graph, retrieving the related entities may involve retrieving a plurality (e.g., all) entities, which are connected either directly or indirectly to a source entity.

Below is an example of the output of resolved entities using graph model 124.

| Node 1 | Node 2 |
|--------|--------|
| ABC | BEF |
| BEF | CDE |
| QRS | TUV |
| CDE | BEF |

In contrast, label model 126 may be utilized for associating entities by associating a common (e.g., unique) label with the related entities. During an initial resolution pass, label model 126 may be slow and resource intensive because it has to identify, for example, all matches within the table. However retrieving related entities during later passes would involve finding entities that are associated with the same label and is faster and less resource intensive because unlike graph model 124 not all branches in the tree need to be traversed to find all the related entities. Below is an example of the output of resolved entities in the above example for graph model 124, using the label model 126.

| Node ID | Cluster Label |
|---------|---------------|
| ABC | 1 |
| BEF | 1 |
| CDE | 1 |
| QRS | 2 |
| TUV | 2 |

As shown in the label model above, a label 1 is associated with the entities in the first three entries in the table, indicating ABS, BEF and CDE are related. A different label 2 is associated with the last two entries in the table, indicating QRS and TUV are related. Advantageously, in the label model, two passes through the model (e.g., a first pass to find all entries associated with label 1, and a second pass to find all entries associated with label 2) are needed to find the associated entities. Whereas, in the earlier graph model, multiple passes would have to be made to find all relationships and entities with relationships in the graph model.

In accordance with one embodiments, a hybrid approach may be employed that combines the advantages of the graph model's "write" speed with the more efficient "read" speed of the label model to provide the most efficient entity resolution and retrieval solution. In some embodiments, graph model 124 and label model 126 may be a persistent data structure that may, for example, store entities as tuples (i.e., a finite ordered list or sequence of elements). Some tuples may be implemented as data types. Alternatively, record types featuring unordered elements accessed by labels may be used. Ordered tuple product types and unordered record types may be also combined into a single construct in certain implementations.

In one implementation, a hybrid model may be constructed in which both graph model 124 and label model 126 are utilized. For example, a record in graph model 124 may identify two related entities as the two vertices in the relationship. Properties for the relationship (e.g., the strength of the relationship) may be added in graph model 124 or label model 126. To track whether a relationship in graph model 124 has been converted to label model 126, other relationship properties may be added to indicate whether a relationship in graph model 124 is unoptimized. For the purpose of updating relationships, a list of entities that are directly related to the entities in the updated relationship in graph model 124 may be generated. Further, entries from label model 126 that reference an entity in the updated relationship may be removed.

In one embodiment, one or more obsolete entities (e.g. relationships that are impacted by the addition of a new relationship or removal of an old relationship) may be removed from graph model. To reflect the removal of an entity the in both graph model 124 and a corresponding label model 126, the following operations may be implemented: remove records from graph model 124 that reference a target entity being removed, generate a list of entities that have the same label as the entity being removed in label model 126, remove records that have the same label as the deleted entry from the label model 126, recalculate relationships for the list of entities generated, and store relationship generated with the unoptimized flag in graph model 124.

In accordance with one or more implementations, retrieving relationships for a given entity (referred to as the source entity) may be accomplished by retrieving the source entity from the label model 126. If the source entity was found in the label model 126, entities with the same label from the label model 126 may be retrieved. Further, entities that are directly connected to the source entity and the entities related to the source entity are determined based on the relationships in graph model 124. The process may be repeated for each entity in label model 126, until no more entities are left.

Referring to FIG. 2, optimizing entity relationships in graph model 124 and label model 126 may be accomplished by way of performing a series of processes to update the entries in graph model 124 and label model 126 at predetermined time intervals. Entity relationships may be stored and updated in graph model 124 first, as new relationships between the entities included in graph model 124 are added or removed. A process may be executed that examines relationships in graph model 124 and accordingly updates, modifies or deletes entries in label model 126 that are no longer valid. While the above process is executing, the complete set of relationships for an entity may be retrieved based on information available from graph model 124 or label model 126.

In accordance with example embodiments, when a relationship associated with an entity (e.g., a target entity) in graph model 124 is updated, a value (e.g., a flag) associated with the target entity may be set (or unset) to indicate the target entity is unoptimized. An unoptimized entity for the purpose of this disclosure may be an entity with an updated relationship in graph model 124, where such updated relationship is not reflected in label mode 126. In one implementation, to optimize graph model 124, one or more entities in graph model 124 that are unoptimized may be identified (S205).

In one implementation, other entities (i.e., secondary entities) that are related, either directly or indirectly, to an unoptimized entity may be also identified. It may be then determined whether a secondary entity, related to the unoptimized entity, already exists in label model 126 and associated with at least a first label (S210). If so, the first label may be selected for use as a cluster label (i.e., a common label) for a cluster of entities (e.g., all entities) that are related to the identified unoptimized entity, such that the records in the label model 126 may be updated to associate one or more of the related entities with the first label (S220). One or more entities (e.g., found in graph model 124) that are related to the unoptimized entity but do not have an entry in the label model 126 may be added to the label mode 126 as associated with the first label (S230).

The above implementation, thus, provides for updating label model 126 based on entities and relationships defined in graph model 124, as such entities and relationships are periodically modified. As provided herein, when an entity or relationship in graph model 124 is modified, a flag or value associated with the entry may be set to indicate the entity is unoptimized in label model. Such setting allows for a series of unoptimized entities in graph model 124 to be identified periodically. The unoptimized entries in graph model 124, once optimized by way of the above operations, may be updated to reflect the optimization is completed, for example, by resetting a corresponding optimization flag in graph model 124 (S240).

Referring back to FIG. 2, in example scenarios, when none of the related entities to an unoptimized entity in graph model 124 has an entry in the label model 126, a second label (e.g., a unique or new label) may be generated (S250). In this example scenario, entities that are related to the unoptimized entity (as well as the unoptimized entity itself) may be stored in label model 126 as associated with the second label (e.g., the newly generated label) (S260). Accordingly, new relationships as added to or removed from graph model 124 may be updated in label model 126 by way of the above optimization process (S240).

The following provides a simplified example of the operations illustrated in FIG. 2. Considering six entities (e.g., A, B, C, D, E, F) stored in database 140, the relationships between the six entities may be as defined by way of the following graphical presentation, indicating that A is directly related to both B and C, but indirectly related to D.

A - - - B - - - C - - - D
A - - - C

Without limiting the scope of the claimed subject matter to particular embodiments or data structures, to generate a table that represents a graph model 124, computing table data structures such as those disclosed below may be used to stored relationships between various entities. For example, the following table may be implemented to reflect the addition of an entity such as a person A to graph model 124.

| Person 1 |
| --- |
| A |

Person B may be found to be related to person A. The relationship table may be updated as follows:

| Person 1 | Person 2 |
| --- | --- |
| A | B |

Person C may be found to have a relationship with A and B, which may be reflected as follows:

| Person 1 | Person 2 |
| --- | --- |
|   | B |
| B | C |
| A | C |

Person D may be found to have a relationship with C, which may be reflected as follows:

| Person 1 | Person 2 |
| --- | --- |
| A | B |
| B | C |
| A | C |
| C | D |

Based on the above graph model 124, a label model 126 may be generated according to the following operations:
  Relationships that A has may be looked up in the relationships table for graph model above.
    The following relationships are retrieved (A, B) and (A,C)
  Relationships that contain B or C may be retrieved next with two lookups in the above graph model table (once for B, and once for C)
    The following relationships are retrieved (A, B), (A,C), (B,C), and (C,D)
  New node discovered in step 2 is D. Therefore, relationships that involve D are looked up
    The relationship (C, D) is returned
  Exit since no new nodes are discovered in the last iteration.

Accordingly, the corresponding relationships may be identified and a label model 126 may be generated based on entries in the following table:

| Person | Label |
| --- | --- |
| A | 1 |
| B | 1 |
| C | 1 |
| D | 1 |

Using the label model 126, retrieving people that are related to A involves the following operation, which is substantially more efficient than operations needed to retrieve the same relationships from the graph model 124:

Retrieve A's label from the relationship table for label model 126
A returns a label of 1
Retrieve all nodes with a label of 1 from the label model
A, B, C, D are returned In an example scenario, a new Person E, not related to any other nodes, may be added to graph model 124. In this scenario, no nodes will be added to the relationship table because there aren't any relationships between E and other entities in the table.

| Person 1 | Person 2 |
|---|---|
| A | B |
| B | C |
| A | C |
| C | D |
| F | |

If a person F, related to E, is added, the relationship table for graph model 124 may be represented as follows, if the nodes in graph model 124 have not been optimized (i.e., if label model 126 is not generated):

| Person 1 | Person 2 |
|---|---|
| A | B |
| B | C |
| A | C |
| C | D |
| F | E |

In contrast, if a person F, related to E, is added, the relationship table for graph model 124 may be represented as follows, if the nodes in graph model 124 have been optimized (i.e., if label model 126 is already generated):

| Person 1 | Person 2 |
|---|---|
| F | E |

When optimization process in FIG. 2 is executed, entities E and F may be added to the label model table as provided below, with E and F being stored with a different label that indicates the two entities are not related to the other entities.

| Person | Label |
|---|---|
| A | 1 |
| B | 1 |
| C | 1 |
| D | 1 |
| E | 2 |
| F | 2 |

Figure 3:
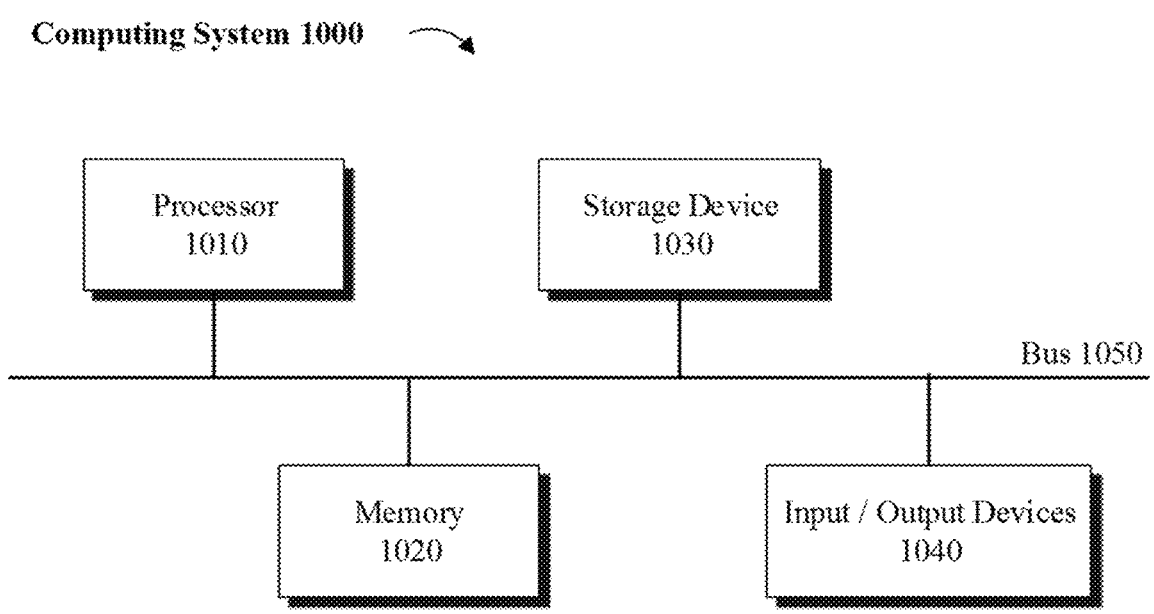
FIG. 3 is a block diagram of a computing system that may be utilized to perform one or more computing processes disclosed herein as consistent with one or more disclosed features.

Referring to FIG. 3, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 3, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method comprising:
accessing a database of records associated with both a graph model and a label model, the label model corresponding with the graph model and the label model implemented to reflect entities included in the graph model and relationships between the entities included in the graph model based on data stored in the database of records,
the label model being updated based on one or more entities being added to or removed from the graph model and based on one or more relationships between the entities included in the graph model being updated, the label model reflecting same entities and relationships as the graph model, when the entities in the graph model are in an optimized state as identified by a status identifier;
parsing the graph model to identify a set of unoptimized entities represented by one or more nodes in a graph model, an unoptimized entity in the graph model being identifiable based on a value of the status identifier assigned to the unoptimized entity, a connection between a first node and a second node in the one or more nodes of the graph model representing an association between a first entity represented by the first node and a second entity represented by the second node;
determining, by way of the parsing of the graph model, that the first entity is unoptimized in the label model based on a first value of a first status identifier assigned to the first node in the graph model,
the first value of the first status identifier being set, in response to determining that the first entity has an updated relationship with the second entity as reflected by a change in the connection between the first node and the second node in the graph model due to an update in relationships between the entities included in the graph model;

determining whether the change in the connection between the first node and the second node is due to addition of a connection or removal of a connection between the first node and the second node, the addition of the connection representing existence of a relationship between the first entity and the second entity, the removal of the connection between the first node and the second node representing lack of existence of a relationship between the first entity and the second entity;

determining whether the second entity is associated with a first label associated with the first entity in the label model, in response to determining that the second entity is stored in the label model;

associating the first label with the second entity, in response to determining that the connection was added between the first node and the second node in the graph model due to the update;

disassociating the first label from the second entity, in response to determining that the connection was removed between the first node and the second node in the graph model due to the update; and updating the value of the status identifier assigned to the unoptimized entity in the graph model to indicate the unoptimized entity has an optimized status.

2. The method of claim 1, further comprising associating related entities for the first entity with the first label.

3. The method of claim 2, wherein the related entities for the first entity are stored in the label model in association with the first label.

4. The method of claim 1, wherein a second label is generated in response to determining that the second entity in the label model is not associated with the first label.

5. The method of claim 4, wherein the second label is distinguishable from the first label.

6. The method of claim 4, wherein the first entity and the related entities are stored in the label model in association with the second label.

7. The method of claim 1, wherein the graph model is represented by a data structure in which related entities are identified by way associating a first record, including the first entity, with a second record, including the second entity, using a pointer mechanism connecting the first record and the second record.

8. The method of claim 1, wherein the label model is represented by a data structure in which related entities are identified by way of associating related entities with a common label.

9. The method of claim 8, wherein the common label is a predetermined value.

10. The method of claim 1, wherein the optimized status is defined by a flag configured to have a first state when a respective entity is optimized, and the flag configured to have a second value when the respective entity is unoptimized.

11. A system comprising:
at least one programmable processor; and
a non-transitory machine-readable medium storing instructions that, when executed by the at least one programmable processor, cause the at least one programmable processor to perform operations comprising:
accessing a database of records associated with both a graph model and a label model, the label model corresponding with the graph model and the label model implemented to reflect entities included in the graph model and relationships between the entities included in the graph model based on data stored in the database of records,
the label model being updated based on one or more entities being added to or removed from the graph model and based on one or more relationships between the entities included in the graph model being updated, the label model reflecting same entities and relationships as the graph model, when the entities in the graph model are in an optimized state as identified by a status identifier;

parsing the graph model to identify a set of unoptimized entities represented by one or more nodes in a graph model, an unoptimized entity in the graph model being identifiable based on a value of the status identifier assigned to the unoptimized entity, a connection between a first node and a second node in the one or more nodes of the graph model representing an association between a first entity represented by the first node and a second entity represented by the second node;

determining, by way of the parsing of the graph model, that the first entity is unoptimized in the label model based on a first value of a first status identifier assigned to the first node in the graph model, the first value of the first status identifier being set, in response to determining that the first entity has an updated relationship with the second entity as reflected by a change in the connection between the first node and the second node in the graph model due to an update in relationships between the entities included in the graph model;

determining whether the change in the connection between the first node and the second node is due to addition of a connection or removal of a connection between the first node and the second node, the addition of the connection representing existence of a relationship between the first entity and the second entity, the removal of the connection between the first node and the second node representing lack of existence of a relationship between the first entity and the second entity;

determining whether the second entity is associated with a first label associated with the first entity in the label model, in response to determining that the second entity is stored in the label model;

associating the first label with the second entity, in response to determining that the connection was added between the first node and the second node in the graph model due to the update;

disassociating the first label from the second entity, in response to determining that the connection was removed between the first node and the second node in the graph model due to the update; and updating the value of the status identifier assigned to the unoptimized entity in the graph model to indicate the unoptimized entity has an optimized status.

12. The system of claim 11, further comprising associating related entities for the first entity with the first label.

13. The system of claim 12, wherein the related entities for the first entity are stored in the label model in association with the first label.

14. The system of claim 11, wherein a second label is generated in response to determining that the second entity in the label model is not associated with the first label.

15. The system of claim 14, wherein the second label is distinguishable from the first label.

16. A computer program product comprising a non-transitory machine-readable medium storing instructions that, when executed by at least one programmable processor, cause the at least one programmable processor to perform operations comprising:

accessing a database of records associated with both a graph model and a label model, the label model corresponding with the graph model and the label model implemented to reflect entities included in the graph model and relationships between the entities included in the graph model based on data stored in the database of records, the label model being updated based on one or more entities being added to or removed from the graph model and based on one or more relationships between the entities included in the graph model being updated, the label model reflecting same entities and relationships as the graph model, when the entities in the graph model are in an optimized state as identified by a status identifier;

parsing the graph model to identify a set of unoptimized entities represented by one or more nodes in a graph model, an unoptimized entity in the graph model being identifiable based on a value of the status identifier assigned to the unoptimized entity, a connection between a first node and a second node in the one or more nodes of the graph model representing an association between a first entity represented by the first node and a second entity represented by the second node;

determining, by way of the parsing of the graph model, that the first entity is unoptimized in the label model based on a first value of a first status identifier assigned to the first node in the graph model, the first value of the first status identifier being set, in response to determining that the first entity has an updated relationship with the second entity as reflected by a change in the connection between the first node and the second node in the graph model due to an update in relationships between the entities included in the graph model;

determining whether the change in the connection between the first node and the second node is due to addition of a connection or removal of a connection between the first node and the second node, the addition of the connection representing existence of a relationship between the first entity and the second entity, the removal of the connection between the first node and the second node representing lack of existence of a relationship between the first entity and the second entity;

determining whether the second entity is associated with a first label associated with the first entity in the label model, in response to determining that the second entity is stored in the label model;

associating the first label with the second entity, in response to determining that the connection was added between the first node and the second node in the graph model due to the update;

disassociating the first label from the second entity, in response to determining that the connection was removed between the first node and the second node in the graph model due to the update; and updating the value of the status identifier assigned to the unoptimized entity in the graph model to indicate the unoptimized entity has an optimized status.

17. The computer program product of claim 16, further comprising associating related entities for the first entity with the first label.

18. The computer program product of claim 17, wherein the related entities for the first entity are stored in the label model in association with the first label.

19. The computer program product of claim 16, wherein a second label is generated in response to determining that the second entity in the label model is not associated with the first label.

20. The computer program product of claim 19, wherein the second label is distinguishable from the first label.

* * * * *